(12) United States Patent (10) Patent No.: US 8,194,997 B2
Segall et al. (45) Date of Patent: Jun. 5, 2012

(54) METHODS AND SYSTEMS FOR TONE MAPPING MESSAGING

(75) Inventors: Christopher A. Segall, Camas, WA (US); Louis Joseph Kerofsky, Camas, WA (US); Shawmin Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1181 days.

(21) Appl. No.: 11/566,657

(22) Filed: Dec. 4, 2006

(65) Prior Publication Data

US 2007/0223813 A1 Sep. 27, 2007

Related U.S. Application Data

(60) Provisional application No. 60/785,486, filed on Mar. 24, 2006, provisional application No. 60/806,931, filed on Jul. 10, 2006.

(51) Int. Cl.
*H04N 11/04* (2006.01)
*H04N 7/00* (2011.01)
*H04N 5/14* (2006.01)
*H04N 5/76* (2006.01)
*H04N 7/12* (2006.01)
*H04N 11/02* (2006.01)
*G06K 9/40* (2006.01)
*G06K 9/54* (2006.01)
*G06K 9/60* (2006.01)
*G06F 17/00* (2006.01)
*G06T 1/00* (2006.01)
*G09G 5/10* (2006.01)
*G06K 9/00* (2006.01)
*G06K 9/36* (2006.01)
*G06K 9/46* (2006.01)
*G06F 7/00* (2006.01)
*G03F 3/08* (2006.01)

(52) U.S. Cl. ........ 382/274; 382/128; 382/162; 382/168; 382/232; 382/305; 345/418; 345/690; 348/231.99; 348/425.1; 348/473; 348/671; 707/602; 358/518

(58) Field of Classification Search .......... 382/128–132, 382/254, 274, 276, 305, 232; 707/201, 602; 358/1.9, 1.13, 3.27, 516; 345/112, 131, 139, 345/147, 439, 432, 581, 601, 589, 582; 703/3; 348/223.1, 390.1, 425.1, 441

See application file for complete search history.

(56) References Cited

U.S. PATENT DOCUMENTS 5,500,677 A 3/1996 Fert et al.
(Continued)

FOREIGN PATENT DOCUMENTS

EP 0644695 3/1995
(Continued)

OTHER PUBLICATIONS

Sullivan et al., "The H.264/AVC Advanced Video Coding Standard: Overview and Introduction to the Fidelity Range Extensions", SPIE Conference on Applications of Digital Image Processing XXVII—Special Session on Advances in the New Emerging Standard: H.264/AVC, Aug. 2004.*

(Continued)

*Primary Examiner* — Anand Bhatnagar
*Assistant Examiner* — Nathan Bloom
(74) *Attorney, Agent, or Firm* — Chernoff Vilhauer McClung & Stenzel, LLP

(57) ABSTRACT

Embodiments of the present invention comprise methods and systems for signaling tone map data to an image recipient.

29 Claims, 11 Drawing Sheets

U.S. PATENT DOCUMENTS

| | | | |
|---|---|---|---|
| 5,603,012 A | 2/1997 | Sotheran | |
| 5,777,678 A | 7/1998 | Ogata et al. | |
| 5,832,120 A | 11/1998 | Prabhakar et al. | |
| 5,930,397 A | 7/1999 | Tsujii et al. | |
| 6,057,884 A | 5/2000 | Chen et al. | |
| 6,345,128 B1* | 2/2002 | Stokes | 382/254 |
| 6,396,422 B1 | 5/2002 | Barkan | |
| 6,400,996 B1 | 6/2002 | Hoffberg et al. | |
| 6,484,631 B2* | 11/2002 | Degani et al. | 101/171 |
| 6,490,320 B1 | 12/2002 | Vetro | |
| 6,493,386 B1 | 12/2002 | Vetro | |
| 6,574,279 B1 | 6/2003 | Vetro | |
| 6,577,753 B2* | 6/2003 | Ogawa | 382/132 |
| 6,748,020 B1 | 6/2004 | Eifrig et al. | |
| 6,765,931 B1 | 7/2004 | Rabenko | |
| 6,778,691 B1* | 8/2004 | Barski et al. | 382/132 |
| 6,795,501 B1 | 9/2004 | Zhu et al. | |
| 6,829,301 B1 | 12/2004 | Tinker et al. | |
| 6,850,252 B1 | 2/2005 | Hoffberg | |
| 6,867,717 B1 | 3/2005 | Ion et al. | |
| 6,879,731 B2 | 4/2005 | Kang et al. | |
| 6,895,052 B2 | 5/2005 | Hanamura et al. | |
| 6,968,007 B2 | 11/2005 | Barrau | |
| 6,996,173 B2 | 2/2006 | Wu | |
| 7,006,881 B1 | 2/2006 | Hoffberg et al. | |
| 7,010,174 B2 | 3/2006 | Kang et al. | |
| 7,054,473 B1* | 5/2006 | Roehrig et al. | 382/128 |
| 7,315,385 B2* | 1/2008 | Iida et al. | 358/1.13 |
| 8,023,768 B2* | 9/2011 | Wilensky et al. | 382/283 |
| 2001/0043345 A1* | 11/2001 | Rumph et al. | 358/1.9 |
| 2002/0054638 A1 | 5/2002 | Hanamura | |
| 2002/0080380 A1* | 6/2002 | Sugiura et al. | 358/1.13 |
| 2002/0118883 A1* | 8/2002 | Bhatt | 382/224 |
| 2002/0154694 A1 | 10/2002 | Birch | |
| 2002/0163676 A1* | 11/2002 | Jones et al. | 358/505 |
| 2002/0171852 A1* | 11/2002 | Zhang et al. | 358/1.9 |
| 2003/0002748 A1 | 1/2003 | Funahashi | |
| 2003/0035488 A1 | 2/2003 | Barrau | |
| 2003/0043908 A1 | 3/2003 | Gao | |
| 2003/0112863 A1 | 6/2003 | Demos | |
| 2003/0142357 A1* | 7/2003 | Gindele et al. | 358/3.27 |
| 2003/0184812 A1 | 10/2003 | Minakuti et al. | |
| 2003/0194007 A1 | 10/2003 | Chen | |
| 2004/0001547 A1 | 1/2004 | Mukherjee | |
| 2004/0036899 A1* | 2/2004 | Takano et al. | 358/1.9 |
| 2004/0151249 A1 | 8/2004 | Morel | |
| 2004/0170308 A1* | 9/2004 | Belykh et al. | 382/128 |
| 2005/0013501 A1 | 1/2005 | Kang et al. | |
| 2005/0030315 A1 | 2/2005 | Cohen et al. | |
| 2005/0147163 A1 | 7/2005 | Li | |
| 2005/0213128 A1* | 9/2005 | Imai et al. | 358/1.9 |
| 2005/0254707 A1* | 11/2005 | Takahashi | 382/169 |
| 2006/0002611 A1 | 1/2006 | Mantiuk et al. | |
| 2006/0015919 A1 | 1/2006 | Karppinen et al. | |
| 2006/0026511 A1* | 2/2006 | Rainero et al. | 715/523 |
| 2006/0077405 A1 | 4/2006 | Topfer et al. | |
| 2006/0083303 A1 | 4/2006 | Han et al. | |
| 2006/0126962 A1 | 6/2006 | Sun | |
| 2006/0153294 A1 | 7/2006 | Wang et al. | |
| 2006/0200253 A1 | 9/2006 | Hoffberg et al. | |
| 2006/0200258 A1 | 9/2006 | Hoffberg et al. | |
| 2006/0200259 A1 | 9/2006 | Hoffberg et al. | |
| 2006/0200260 A1 | 9/2006 | Hoffberg et al. | |
| 2006/0209959 A1 | 9/2006 | Sun | |
| 2006/0210185 A1 | 9/2006 | Sun | |
| 2006/0221760 A1 | 10/2006 | Chen | |
| 2006/0251330 A1 | 11/2006 | Toth et al. | |
| 2007/0140354 A1 | 6/2007 | Sun | |
| 2007/0160133 A1 | 7/2007 | Bao et al. | |
| 2007/0201560 A1 | 8/2007 | Segall | |
| 2008/0310501 A1* | 12/2008 | Ward et al. | 375/240.02 |
| 2009/0087111 A1* | 4/2009 | Noda et al. | 382/238 |
| 2009/0175338 A1* | 7/2009 | Segall | 375/240.14 |

FOREIGN PATENT DOCUMENTS

| | | |
|---|---|---|
| EP | 0966162 | 12/1999 |
| EP | 1170954 A1 | 1/2002 |
| EP | 1195992 A1 | 4/2002 |
| EP | 1248466 A1 | 10/2002 |
| JP | 2005-056271 | 3/1993 |
| JP | 7162870 | 6/1995 |
| JP | 9070044 | 3/1997 |
| JP | 9182085 | 7/1997 |
| JP | 1018085 | 1/1999 |
| JP | 11331613 | 11/1999 |
| JP | 2000184337 | 6/2000 |
| JP | 2002/019197 | 1/2002 |
| JP | 2002019197 A | 1/2002 |
| JP | 2002/170110 | 6/2002 |
| JP | 2002170110 A | 6/2002 |
| JP | 2002/306425 | 10/2002 |
| JP | 2002306425 A | 10/2002 |
| JP | 2003/299116 | 10/2003 |
| JP | 2003299116 A | 10/2003 |
| JP | 2004/165814 | 6/2004 |
| JP | 2004165814 A | 6/2004 |
| JP | 2004/221645 | 8/2004 |
| JP | 2004221645 A | 8/2004 |
| JP | 2004/343560 | 12/2004 |
| JP | 2004-363931 | 12/2004 |
| JP | 2004343560 A | 12/2004 |
| JP | 2005-80153 | 3/2005 |
| JP | 2005-094054 | 4/2005 |
| JP | 2005/151091 | 6/2005 |
| JP | 2005-167431 | 6/2005 |
| JP | 2005151091 A | 6/2005 |
| JP | 2005/268952 | 9/2005 |
| JP | 2005/269145 | 9/2005 |
| JP | 2005268952 A | 9/2005 |
| JP | 2005269145 A | 9/2005 |
| JP | 2007/534238 | 11/2007 |
| WO | WO /2005104035 | 11/2005 |
| WO | WO2005104035 A1 | 11/2005 |

OTHER PUBLICATIONS

European Patent Office, Decision to Grant Patent and associated claim set of EP07006082, Aug. 30, 2011.*

Winken, M.; Marpe, D.; Schwarz, H.; Wiegand, T.; , "Bit-Depth Scalable Video Coding," Image Processing, 2007. ICIP 2007. IEEE International Conference on , vol. 1, No., pp. I-5-I-8, Sep. 16-Oct. 19, 2007.*

Marco Eichelberg, Joerg Riesmeier, Klaus Kleber, Joerg Holstein, Herman J. Oosterwijk, and Peter F. Jensch, "Consistency of softcopy and hardcopy: preliminary experiences with the new DICOM extensions for image display", Proc. SPIE 3980, 97 (2000).*

European Patent App. No. 07006082.7—European Office Action dated Dec. 9, 2009 for a corresponding foreign patent application.

Japanese Patent App. No. 2007-075494—Japanese Office Action dated Jan. 12, 2010 for a corresponding foreign patent application.

Rafal Mantiuk, Alexander Efremov, Karol Myszkowski, Hans-Peter Seidel. Backward Compatible High Dynamic Range MPEG Video Compression. In: Proc. of SIGGRAPH '06 (Special issue of ACM Transactions on Graphics). To appear. 2006.

Joint Draft 9 of SVC Amendment; Draft ISO/IEC 14496-10 (2006); Joint Video Team (JVT) of ISO/IEC MPEG & ITU-T VCEG (ISO/IEC JTC1/SC29/WG11 and ITU-T SG16 Q.6); Document: JVT-V201; 22$^{nd}$ Meeting: Marrakech, Morocco, Jan. 13-19, 2007.

International Search Report for PCT/JP2008/054687.

Joint Video Team (JVT) of ISO/IEC MPEG & ITU-T VCEG,Advanced video coding for generic audiovisual services, ISO/IEC 14496-10, JVT-T201, Austria, Jul. 2006.

International Telecommunication Union, Series H: Audiovisual and Multimedia Systems; Coding of Moving Video; H.264, Mar. 2005.

Internation Telecommunication Union, ISO/IEC 13818-2 MPEG-2, Geneva, 1995.

International Organisation for Standardisation, MPEG-4 Version 2 Visual Working Draft Rev 5.0, Atlantic City, Oct. 1998.

International Telecommunication Union, Series H: Audiovisual and Multimedia Systems; Video coding for low bit rate communication; H.263, Geneva, Jan. 2005.

Yao-Chung Lin, Chung-Neng Wang, Tihao Chiang, Anthony Vetro, and Huifang Sun, "Efficient FGS to single layer transcoding", Digest of Technical Papers. International Conference on Consumer Electronics, 2002. ICCE. 2002, p. 134-135.

PCT/JP2007/064040 International Search Report.

Office action dated Sep. 3, 2008 for U.S. Appl. No. 11/776,430.

Andrew Segall, "SVC-to-AVC Bit-stream Rewriting for Coarse Grain Scalability", Joint Video Team(JVT) of ISO/IEC MPEG $ ITU-T VCEG (ISO/IEC JTC1/SC29/WG11 and ITU-T SG16 Q.6) 20$^{th}$ Meeting: Klagenfurt, Austria, Jul. 15-21, 2006, JVT-T061.

Brightside Technologies, Inc., "DR37-P: Detailed Preliminary Specifications—V2.0", http://www.brightsidetech.com/products/info/dr37p_specs.pdf.

Y Li, L. Sharan and e. Adelson, "Compressing and Companding High Dynamic Range Images with Subband Architectures", ACM Transactions on Graphics (Proceedings of SIGGRAPH '05), vol. 24, No. 3, Jul. 2005.

R. Mantiuk, G. Krawczyk, K. Myszkowski and H.P. Seidel, "Perception-motivated High Dynamic Range Video Encoding", ACM Transactions on Graphics (Special Issue: Proceedings of SIGGRAPH '04), vol. 23, No. 3, Aug. 2004.

H. Seetzen, W. Heidrich, W. Stuerzlinger, G. Ward, L. Whitehead, M. Trentacoste, A. Ghosh, A. Vorozcovs, "High Dynamic Range Display Systems", ACM Transactions on Graphics (Special Issue: Proceedings of SIGGRAPH '04), vol. 23, No. 3, Aug. 2004.

H. Seetzen, G. Ward, and L. Whitehead, "High Dynamic Range Display Using Low and High Resolution Modulators," The Society for Information Display International Symposium, Baltimore, Maryland, May 2003.

G. Ward and M. Simmons, "JPEG-HDR: A Backwards-Compatible, High Dynamic Range Extension to JPEG," Proceedings of the Thirteenth Color Imaging Conference, Scottsdale, AZ, Nov. 2005.

International Search Report for International Application No. PCT/JP2007/050277.

Joint Video Team (JVT) of ISO/IEC MPEG & ITU-T VCEG, (ISO/IEC JTC1/SC29/WG11 and ITU-T SG16 Q.6), Working Draft 1.0 of 14496-10:200x/AMD1 Scalable Video Coding International Organization for Standardization,Organisation Internationale Normalisation, Coding of Moving Pictures and Audio, ISO/IEC JTC 1/SC 29/WG 11 N6901, Jan. 2005, Hong Kong, China *relevant sections 5 and 6*.

Joint Video Team of ITU-T VCEG and ISO/IEC MPEG, "Advanced Video Coding (AVC)—4th Edition," ITU-T Rec. H.264 and ISO/IEC 14496-10 (MPEG-4 Part 10), Jan. 2005 * section 8.4.2.2.1 *.

Julien Reichel, Heiko Schwarz and Mathias Wien, "Scalable Video Coding—Working Draft 4", JVT-Q201, Nice, FR, Oct. 2005.

F. Durand and J. Dorsey, "Fast Bilateral Filtering for the Display of High-Dynamic-Range Images", Proceedings of SIGGRAPH, San Antonio, TX, Jul. 21-26, 2002.

R. Fattal, D. Lischinski and M. Werman, "Gradient Domian High Dynamic Range Compression", Proceedings of SIGGRAPG, San Antonio, TX, Jul. 21-26, 2002.

L. Meylan and S. Susstrunk, "High Dynamic Range Image Rendering with a Retinex-Based Adaptive Filter", IEEE Transactions on Image Processing, Sep. 2005.

S. Pattanaik, J. Ferwerda, M. Fairchild, D. Greenberg, "A multiscale Model of Adaptation and Spatial Vision for Realisitic Image Display", Proceedings of SIGGRAPH, Orlando, FL, Jul. 19-24, 1998.

E. Reinhard, M. Stark, P. Shirley and J. Ferwerda, "Photographic Tone Reproduction for Digital Images", Proceedings of SIGGRAPH, San Antonio, TX, Jul. 21-26, 2002.

G. Ward Larson, H. Rushmeier and C. Piatko, "A visibility Matching Tone Reproduction Operator for High Dynamic Range Scenes", IEEE Transactions on Visualization and Computer Graphics, 3(4), Oct.-Dec. 1997, pp. 291-306.

E. Reinhard, G. Ward, S. Pattanaik, P. Debevec, High Dynamic Range Imaging: Acquisition, Display and Image-based Lighting, Morgan Kaufmann Publishers, San Francisco, 2005.

Notice of Allowance issued in Japanese Patent Application No. 2007-075494, mailed May 11, 2010; pp. 1-4.

English Translation of Notice of Allowance issued in Japanese Patent Application No. 2007-075494, mailed May 11, 2010; p. 1.

Summons to attend oral proceedings pursuant to Rule 115(1) EPC, European Patent App. No. 07 006 082.7, Sharp Kabushiki Kaisha, dated Mar. 23, 2011, 6 pgs.

* cited by examiner

US 8,194,997 B2

METHODS AND SYSTEMS FOR TONE MAPPING MESSAGING

RELATED REFERENCES

This application claims the benefit of U.S. Provisional Patent Application No. 60/785,486, entitled "Methods and Systems for Dynamic Range Signaling," filed on Mar. 24, 2006; this application also claims the benefit of U.S. Provisional Patent Application No. 60/806,931, entitled "Methods and Systems for Tone Mapping Messaging," filed on Jul. 10, 2006.

FIELD OF THE INVENTION

Embodiments of the present invention comprise methods and systems for tone mapping messaging.

BACKGROUND

Video coding is often influenced by the state-of-the-art in display technology. Coding techniques are developed to reduce the bit-rate of an image sequence, and special emphasis is placed on discarding information that is not visibly noticeable. However, it is important to realize that current state-of-the-art display devices can not reproduce the entire dynamic range of the human visual system. Humans are able to resolve approximately five orders of magnitude of dynamic range within a small time window. This is well below the 2-3 orders of magnitude provided by current consumer technology.

Capturing and processing data with a larger dynamic range is useful for applications that are not constrained by the display. For example, surveillance and security applications may capture a larger dynamic range for off-line analysis. Film makers and videographers can benefit from larger dynamic range data for more controlled tone mapping and color correction processing. Finally, the storage and archival of larger dynamic range material helps "future proof" an archive.

DETAILED DESCRIPTION OF EXEMPLARY EMBODIMENTS

Figure 1:
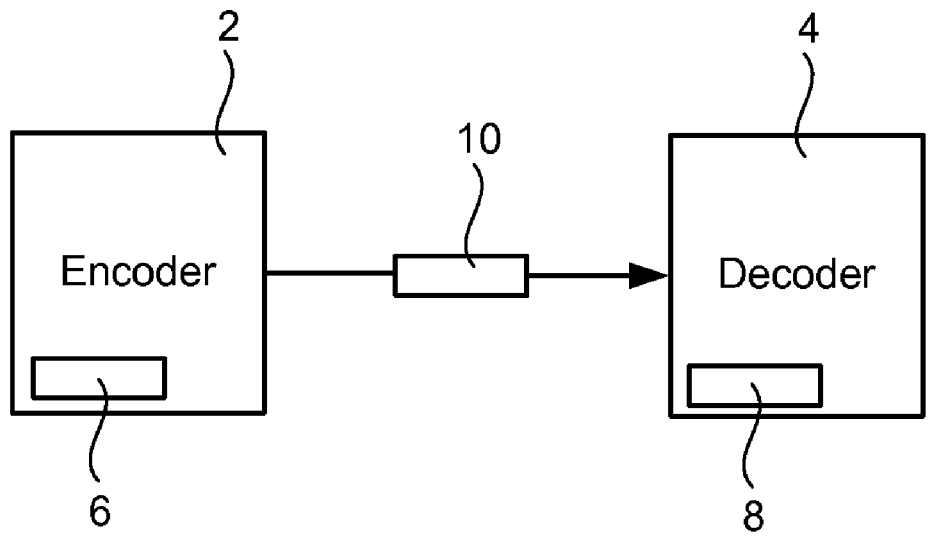
FIG. 1 is a diagram showing an exemplary embodiment comprising an encoder and a decoder.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

H.264/MPEG-4 AVC [Joint Video Team of ITU-T VCEG and ISO/IEC MPEG, "Advanced Video Coding (AVC)—$4^{th}$ Edition," ITU-T Rec. H.264 and ISO/IEC 14496-10 (MPEG4-Part 10), January 2005], which is incorporated by reference herein, is a video codec specification that is related to embodiments of the present invention.

The SVC extension of H.264/MPEG-4 AVC [Working Document 1.0 (WD-1.0) (MPEG Doc. N6901) for the Joint Scalable Video Model (JSVM)], which is incorporated by reference herein, is a layered video codec in which the redundancy between layers is exploited by inter-layer prediction mechanisms.

The additional bit-depth enabled within the AVC video coding standard as well as ongoing investigations within the Joint Video Team allows for smaller quantization intervals and increased PSNR values. While this fidelity will benefit many applications, it is not the only use for higher bit-depth coding. Capturing an expanded dynamic range is also a reasonable use for the higher bit-depths. In embodiments of the present invention, a Supplemental Enhancement Information (SEI) message may be used to encapsulate the dynamic range of the source material within the bit-stream. This signals the use of higher bit-depth profiles for representing larger dynamic range sequences.

Some embodiments of the present invention describe the relationship between a high bit-depth sequence and its more traditional, low bit-depth representation. An example low bit-depth representation would be an 8-bit representation. At one extreme, this relationship may describe the use of a smaller quantization interval. That is that the high bit-depth sequence contains a finely quantized version of the low bit-depth representation. As a second example, the quantization interval may be unchanged between the high bit-depth and low bit-depth data. The additional bits then extend the dynamic range and allow signal information to be coded that is not represented in the traditional, low bit-depth representation. Some embodiments may operate anywhere within the above extremes.

Some embodiments of the present invention comprise sophisticated tone mapping algorithms for converting larger dynamic range images to traditional, low bit-depth images. Some embodiments may or may not define a tone mapping algorithm and may simply indicate the dynamic range corresponding to the additional bits by providing a way to specify the preferred tone mapping curves. In some embodiments of the present invention signals may indicate whether additional bits simply provide fidelity or whether they provide extended dynamic range, in which case a tone mapping process may be used to extract a lower bit-depth image.

Four primary exemplary models may be used to express the relationship between a higher bit-depth and lower bit-depth data. These methods are related to basic tone mapping operations. However, these embodiments provide a flexible way of transmitting the relative dynamic range of a sequence. In some embodiments, a display process may use the signaled information explicitly. However, in some embodiments, the dynamic range SEI message may be used to guide more sophisticated processing algorithms.

Exemplary Model 0

These embodiments comprise a model using linear mapping with clipping. That is to say that the relationship between the high bit-depth and low bit-depth data is a linear function within a particular region of the intensity space. Outside of this region though, all other values are clipped.

Exemplary Model 1

These embodiments comprise a sigmoidal model, or S-curve. This is similar to the previous model, in that there is a mapping between intensity values within a central region. However, the sigmoid does not impose a hard clipping operation at its boundaries. Instead, a soft clip or roll off occurs.

Exemplary Model 2

These embodiments comprise a user defined lookup table. This is the most general method for expressing the relationship between a high bit-depth image and low bit-depth data. The i-th entry of the lookup table defines the beginning point of an interval within the high bit-depth data such that all data in the interval are mapped to the value i in the low bit-depth data.

Exemplary Model 3

These embodiments comprise a piece-wise linear model. In this model, the coordinates of the pivot points of the piece-wise linear model are transmitted. The mapping values between two pivot points can be obtained by simple linear interpolation.

Exemplary Embodiments

To facilitate current and future interoperability between systems with an enhanced dynamic range, embodiments of the present invention may comprise an SEI message that encapsulates information about the acquisition process into the SEI message. This data may contain information not available in the video usability information (VUI), and its syntax may specifically describe the relationship between the acquired dynamic range and a lower bit-depth representation. An exemplary SEI message may be specified as follows:

Values of tone_map_id from 0 to 255 and from 512 to $2^{31}-1$ may be used as determined by the application. Values of tone_map_id from 256 to 511 and from $2^{31}$ to $2^{32}-1$ are reserved for future use by ITU-T|ISO/IEC. Decoders encountering a value of tone_map_id in the range of 256 to 511 or in the range of $2^{31}$ to $2^{32}-1$ shall ignore (remove from the bitstream and discard) it.

Note—the tone_map_id flag can be used to support tone mapping operations that are suitable for different display scenarios. For example, different values of tone_map_id may correspond to different display bit-depths.

tone_map_cancel_flag equal to 1 indicates that the SEI message cancels the persistence of any previous tone mapping SEI message in output order. tone_map_cancel_flag equal to 0 indicates that tone mapping information follows.

tone_map_repetition_period specifies the persistence of the tone mapping SEI message and may specify a picture order count interval within which another tone mapping SEI message with the same value of tone_map_id or the end of the coded video sequence shall be present in the bitstream. The value of tone_map_repetition_period shall be in the range of 0 to 16384, inclusive.

tone_map_repetition_period equal to 0 specifies that the tone map information applies to the current decoded picture only.

tone_map_repetition_period equal to 1 specifies that the tone map information persists in output order until any of the following conditions are true.

A new coded video sequence begins

A picture in an access unit containing a tone mapping SEI message with the same value of tone_map_id is output having PicOrderCnt( ) greater than PicOrderCnt(CurrPic).

tone_map_repetition_period equal to 0 or equal to 1 indicates that another tone mapping SEI message with the same value of tone_map_id may or may not be present.

| tone_mapping( payloadSize ) { | C | Descriptor |
|---|---|---|
|   tone_map_id | 5 | ue(v) |
|   tone_map_cancel_flag | 5 | u(1) |
|   if( !tone_map_cancel_flag ) { | | |
|     tone_map_repetition_period | 5 | ue(v) |
|     coded_data_bit_depth | 5 | u(8) |
|     sei_bit_depth | 5 | u(8) |
|     model_id | 5 | ue(v) |
|     if( model_id == 0 ) { | | |
|       min_value | 5 | u(32) |
|       max_value | 5 | u(32) |
|     } | | |
|     if( model_id == 1 ) { | | |
|       sigmoid_midpoint | 5 | u(32) |
|       sigmoid_width | 5 | u(32) |
|     } | | |
|     if( model_id == 2 ) { | | |
|       for( i=0; i < (1<<sei_bit_depth); i++ ) | | |
|         start_of_coded_interval[ i ] | 5 | u(v) |
|     } | | |
|     if( model_id == 3 ) { | | |
|       num_pivots | 5 | u(16) |
|       for( i=0; i < num_pivots; i++ ) | | |
|       { | | |
|         coded_pivot_value[ i ] | 5 | u(v) |
|         sei_pivot_value[ i ] | 5 | u(v) |
|       } | | |
|     } | | |
|   } | | |
| } | | |

Tone Mapping SEI Message Semantics tone_map_id contains an identifying number that may be used to identify the purpose of the tone mapping model. The value of tone_map_id shall be in the range of 0 to $232^{32}-1$, inclusive.

tone_map_repetition_period greater than 1 specifies that the tone map information persists until any of the following conditions are true.

A new coded video sequence begins

A picture in an access unit containing a tone mapping SEI message with the same value of tone_map_id is output having PicOrderCnt( ) greater than PicOrderCnt(CurrPic) and less than or equal to PicOrderCnt(CurrPic)+ tone_map_repetition_period.

tone_map_repetition_period greater than 1 indicates that another tone mapping SEI message with the same value of tone_map_id shall be present for a picture in an access unit that is output having PicOrderCnt( ) greater than PicOrderCnt (CurrPic) and less than or equal to PicOrderCnt(CurrPic)+ tone_map_repetition_period; unless the bitstream ends or a new coded video sequence begins without output of such a picture.

coded_data_bit_depth specifies the bit-depth of the coded data.

sei_bit_depth specifies the bit-depth of the output of the dynamic range mapping function (or tone mapping function) described by the SEI message. The tone mapping function specified with a particular sei_bit_depth is suggested to be reasonable for all display bit depths that are equal to or less than the sei_bit_depth.

model_id specifies the model utilized for mapping the coded bit-depth data into the sei_bit_depth range. Values greater than 3 are reserved for future use by the ITU-T | ISO/IEC. Decoders encountering a value of model_id greater than 3 shall ignore (remove from the bitstream and discard) it.

Note—a model_id of 0 corresponds to a linear mapping with clipping; a model_id of 1 corresponds to a sigmoidal mapping; a model_id of 2 corresponds to a user-defined table mapping, and a model_id of 3 corresponds to a piece-wise linear mapping. All mappings are expressed in the RGB color space and applied to each RGB component separately.

min_value specifies the pixel value in the coded bit-depth coded data that maps to the minimum value in the signaled sei_bit_depth, i.e. 0. It is used in combination with the max_value parameter. All values in the coded data that are less than or equal to min_value are mapped to 0 in sei_bit_depth representation.

max_value specifies the pixel value in the coded data that maps to the maximum value in the signaled sei_bit_depth, i.e. $2^{sei\_bit\_depth}-1$. It is used in combination with the min_value parameter. All values in the coded data that are larger than or equal to max_value are mapped to $(2^{sei\_bit\_depth}-1)$ in the sei_bit_depth representation.

sigmoid_midpoint specifies the value of the coded data (i.e., the X coordinate) that is mapped to the center point of the sei_bit_depth representation, i.e., $2^{sei\_bit\_depth-1}$. This parameter specifies the center location of the sigmoid mapping function that maps the coded_bit_depth to the sei_bit_depth. It is used in combination with the sigmoid_width parameter.

sigmoid_width specifies the distance between two coded data values that are mapped to the 5% and 95% values of $(2^{sei\_bit\_depth}-1)$ in sei_bit_depth representation, respectively. It is used in combination with the sigmoid_midpoint parameter and is interpreted according to the following function:

$$f(i) = int\left(\frac{2^{sei\_bit\_depth} - 1}{1 + \exp\left(\frac{-6*(i - sigmoid\_midpoint)}{sigmoid\_width}\right)} + 0.5\right)$$

for $i = 0, \ldots, (2^{coded\_bit\_depth} - 1)$ start_of_coded_interval[i] specifies the beginning point of an interval in the coded data such that all data within the interval are mapped to value i in the sei_bit_depth representation, i.e., all values in [start_of_coded_interval[i], start_of_coded_interval[i+1]) are mapped to i, where start_of_coded_interval[$2^{sei\_bit\_depth}$] is set to $2^{coded\_bit\_depth}$. The number of bits used for the representation of the sei_to_coded_map is ((coded_data_bit_depth+7)>>3)<<3.

num_pivots specifies the number of pivot points in the piece-wise linear mapping function without counting two default end points, (0,0) and ($2^{coded\_data\_bit\_depth}-1$, $2^{sei\_bit\_depth}-1$).

coded_pivot_value[i] specifies the value in the coded_bit_depth corresponding to the i-th pivot point, i.e., the X coordinate of the i-th pivot point. The number of bits used for the representation of the coded_pivot_value is ((coded_data_bit_depth+7)>>3)<<3.

sei_pivot_value[i] specifies the value in the reference sei_bit_depth corresponding to the i-th pivot point, i.e., the Y coordinate of the i-th pivot point. The number of bits used for the representation of the sei_pivot_value is ((sei_bit_depth+7)>>3)<<3.

Exemplary Embodiments

Some embodiments of the present invention comprise methods and systems for selecting and configuring tone map models for use in decoding, transcoding and/or otherwise processing an image. In some embodiments a plurality of tone map models may be established and associated with tone map model identifiers (IDs). These tone map models may be present at an image receiving device (IRD), which may comprise a decoder, transcoder or other image processing device. In some embodiments, the tone map models may be recorded on the IRD where they may be accessed through their associated IDs. In some embodiments, one or more generalized functions, that may be configured or modified with model parameters may be stored at an IRD where they may be selected and configured through the receipt of selection and configuration data such as a Model ID and model parameters. In some embodiments a configurable linear function, a configurable sigmoid function or another configurable function may be resident on an IRD or may be sent to an IRD in conjunction with an image.

A tone map model may be configured with model parameters that help define a tone map relationship, such as a line slope or curvature value. In some exemplary embodiments, a tone map model parameter may be a minimum value of a linear model line, a maximum value of a linear model line, a map sigmoidal midpoint, a map sigmoidal width, a coded interval limit, a piecewise linear model pivot quantity, a piecewise linear model pivot location or other model parameters.

Some embodiments of the present invention may also comprise a tone map identifier (ID) that may identify the purpose of the tone map model. The tone map ID may identify the goal of the tone map model, the function of the tone map model, the reason for application of the tone map model, the input used to select the tone map model, an error or problem intended to be corrected by the tone map model, a device characteristic related to the tone map model, suitable alternatives to the tone map model or some other model-related characteristic. The tone map ID may also be used to guide the recipient in selecting a pre-established tone map model or an alternative model or processing technique. In some embodiments, a tone map ID may signify a target bit depth for which a tone map is intended.

Some embodiments of the present invention may comprise a tone map cancel flag. A tone map cancel flag may cancel the persistence of a previous tone mapping message. For example, but not by way of limitation, a tone map cancel flag may be used to stop the application of a previously-selected tone map model or model parameter. A tone map cancel flag may be followed by a message or message portion that identifies a new model or parameter to be used after the previous one is canceled. In some embodiments, a default parameter may be used when a previous selection is canceled by the tone map cancel flag.

Some embodiments of the present invention may also comprise a tone map repetition period. A tone map repetition period may specify the persistence of a tone map message or selection. A tone map repetition period message may specify a picture order count interval within which another tone mapping message may apply. A tone map repetition period message may also specify that an associated parameter only applies to a current picture or an otherwise identified picture. A tone map repetition period message may also specify that an associated parameter will apply only for a specified time period. A tone map repetition period message may also specify that an associated parameter will apply until a defined event occurs.

In some embodiments of the present invention, the above-described messages and parameters may be determined at an encoder and signaled to a receiving device through messages that may or may not be attached or embedded in the image or image bitstream.

Some embodiments of the present invention may be described with reference to FIG. 1. In these embodiments, an encoder 2 may provide image encoding functions and, in some embodiments, image analysis functions. The encoder 2 may comprise a tone map model ID record 6 comprising pre-established tone map model identifiers (IDs) and associated parameters that may be selected and transmitted with an image 10 to an image receiving device (IRD), such as a decoder 4. The tone map model IDs may signal one or more tone map model selections that are appropriate for processing a particular image. In some embodiments, the tone map model IDs may specify specific tone map models to be used to convert an image to different bit-depths as needed by an IRD, such as a destination display device. In some embodiments, other information may be transferred to the IRD 4, such as a tone map ID, a tone map cancel flag, a tone map repetition period or another parameter. When tone map models are configurable, an encoder 2 may also transmit tone map configuration parameters to the IRD 4.

In these embodiments, an IRD 4 may comprise a tone map model record 8 comprising tone map models that have been pre-established and associated with tone map IDs. In some embodiments, a tone map ID may be associated with a configurable function, such as a sigmoid function or a linear function. When an IRD receives a tone map ID, the IRD may select a tone map model or function associated with that ID and apply the identified tone map model or function to an image. Since the tone map models or functions are pre-established and stored on the IRD 4, the model may be selected through a very compact identifier without transmitting the entire model definition or function. This technique allows for efficient selection of a tone map and more frequent tone map changes without burdening the bandwidth with full tone map definition data.

Figure 2:
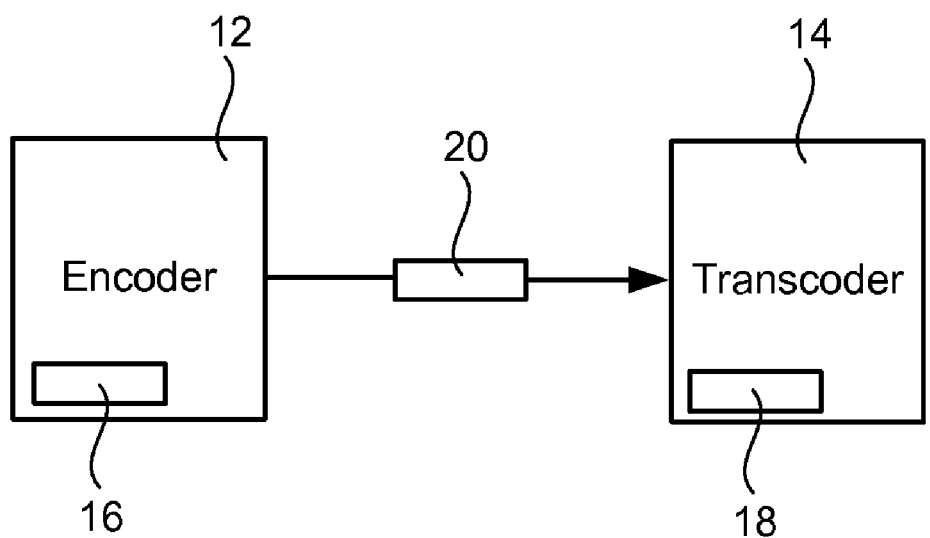
FIG. 2 is a diagram showing an exemplary embodiment comprising an encoder and a transcoder.

Some embodiments of the present invention may be described with reference to FIG. 2. In these embodiments, an encoder 12 comprises a tone map model ID record 12 of tone map characteristics associated with tone map model IDs. These IDs and associated parameters and other messages may be transmitted with an image 20 to an IRD, such as a transcoder 14. The transcoder or other IRD may receive the tone map model ID and any associated information and use that ID and information to select, configure and apply a tone map model or function to an image. Transcoder 14 may comprise a tone map model record 18 that fully defines the characteristics of a tone map model or function and associates tone map models or functions with tone map model IDs. An IRD, such as transcoder 14, may receive a tone map model ID along with an image and use the tone map model ID and any associated information to select a tone map model or function, configure the model or function and apply the model or function to the image.

Figure 3:
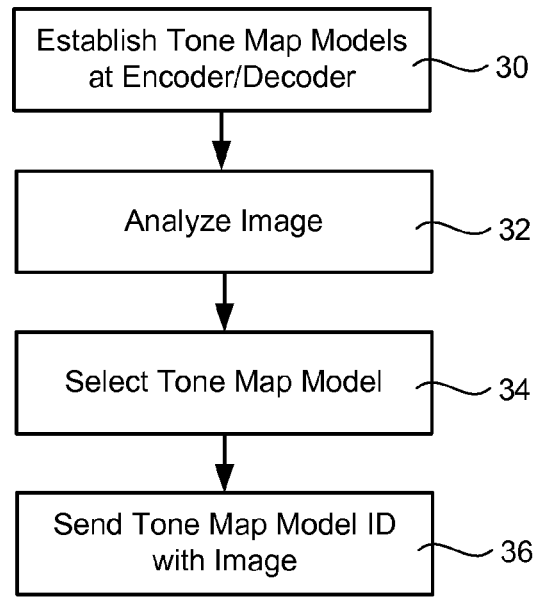
FIG. 3 is a flowchart showing steps of an exemplary embodiment comprising sending a tone map model ID.

Some embodiments of the present invention may be described with reference to FIG. 3. In these embodiments, tone map models are established 30 and associated with tone map model IDs. The IDs are then stored at an encoder where they are associated with image types or other image data. The tone map models or functions are also stored at an image receiving device (IRD), such as a decoder or transcoder. An image may then be analyzed 32 to determine which tone map model or function should be applied to the image. One or more tone map models or functions may then be selected 34 based on the image analysis and/or other information. The tone map model IDs associated with the selected tone map models or functions may then be sent 36 to an IRD for use in selection of a tone map model at the IRD. When multiple model IDs are sent, the IRD may select one of them based on IRD characteristics, such as the dynamic range of the IRD.

Figure 4:
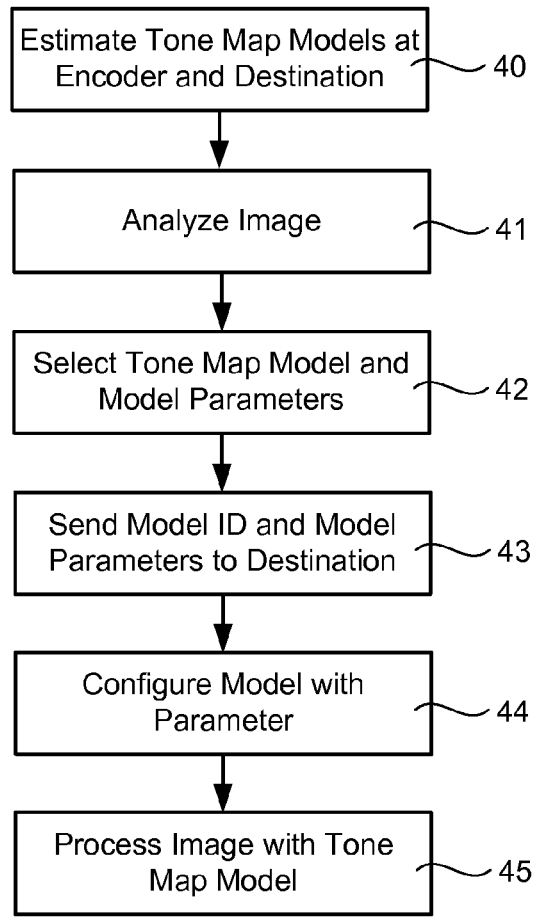
FIG. 4 is a flowchart showing steps of an exemplary embodiment comprising sending a tone map model ID and model configuration parameters.

Some embodiments of the present invention may be described with reference to FIG. 4. In these embodiments, tone map models or functions are established 40 and associated with tone map model IDs. The IDs are then stored at an encoder where they are associated with image types or other image data. The tone map models or functions are also stored at an image receiving device (IRD), such as a decoder or transcoder. An image may then be analyzed 41 to determine which tone map models or functions should be applied to the image and to determine which tone map model configuration parameters should be applied. A tone map model and associated configuration parameters may then be selected 42 based on the image analysis and/or other information. The tone map model ID associated with the selected tone map model and the model configuration parameters may then be sent 43 to an IRD for use in selection and configuration of a tone map model at the IRD. The selected tone map model may then be configured 44 using the tone map configuration parameters. Once configured, the configured tone map model may be applied 45 to the image.

Figure 5:
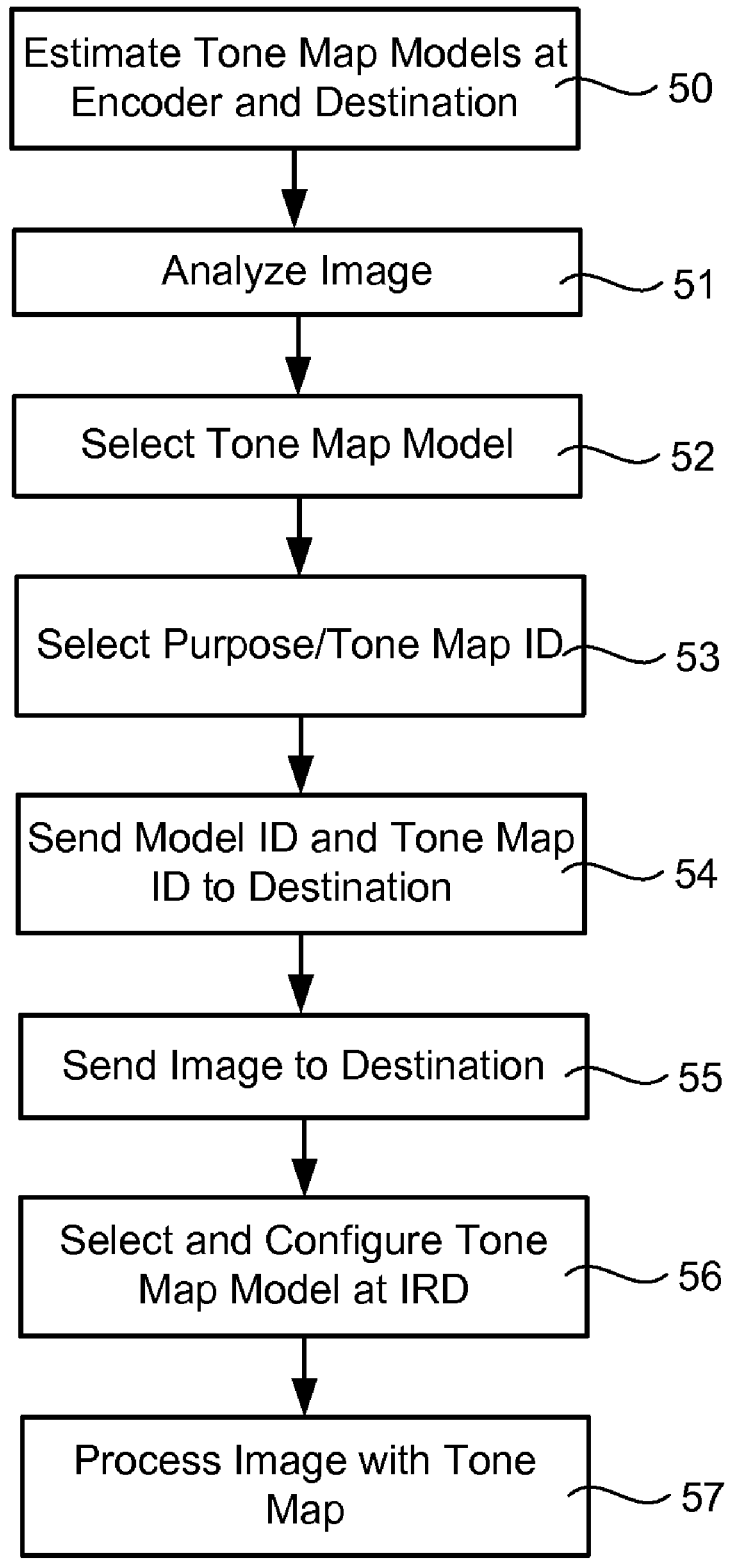
FIG. 5 is a flowchart showing steps of an exemplary embodiment comprising sending a tone map ID.

Some embodiments of the present invention may be described with reference to FIG. 5. In these embodiments, tone map models are established 50 and associated with tone map model IDs. The IDs are then stored at an encoder where they are associated with image types or other image data. The tone map models are also stored at an image receiving device (IRD), such as a decoder or transcoder. An image may then be analyzed 51 to determine which tone maps should be applied to the image for each of a plurality of display device dynamic ranges. A tone map model ID and associated configuration parameters may then be selected 52 for each tone map based on the image analysis and/or other information. A tone map ID, which may identify a purpose for the application of the tone map model, the goal of the tone map model, the function of the tone map model, the reason for application of the tone map model, the input used to select the tone map model, an error or problem intended to be corrected by the tone map model, a device characteristic related to the tone map model, suitable alternatives to the tone map model or some other model-related characteristic may also be determined 53 based on the image analysis 51 or other data. The tone map ID may be used to guide the recipient in selecting a pre-established tone map model or an alternative model or processing technique. In some embodiments, the tone map ID may identify a converted dynamic range to which the tone map will convert an image.

The tone map model ID associated with the selected tone map, any model configuration parameters and the tone map ID may then be sent 54 to an IRD for use in selection and configuration of a tone map model at the IRD. The image may also be sent 55 to the IRD. A tone map model may then be selected and configured 56 using the tone map model ID, tone map configuration parameters and the tone map ID. Once configured, the configured tone map model may be applied 57 to the image.

Figure 6:
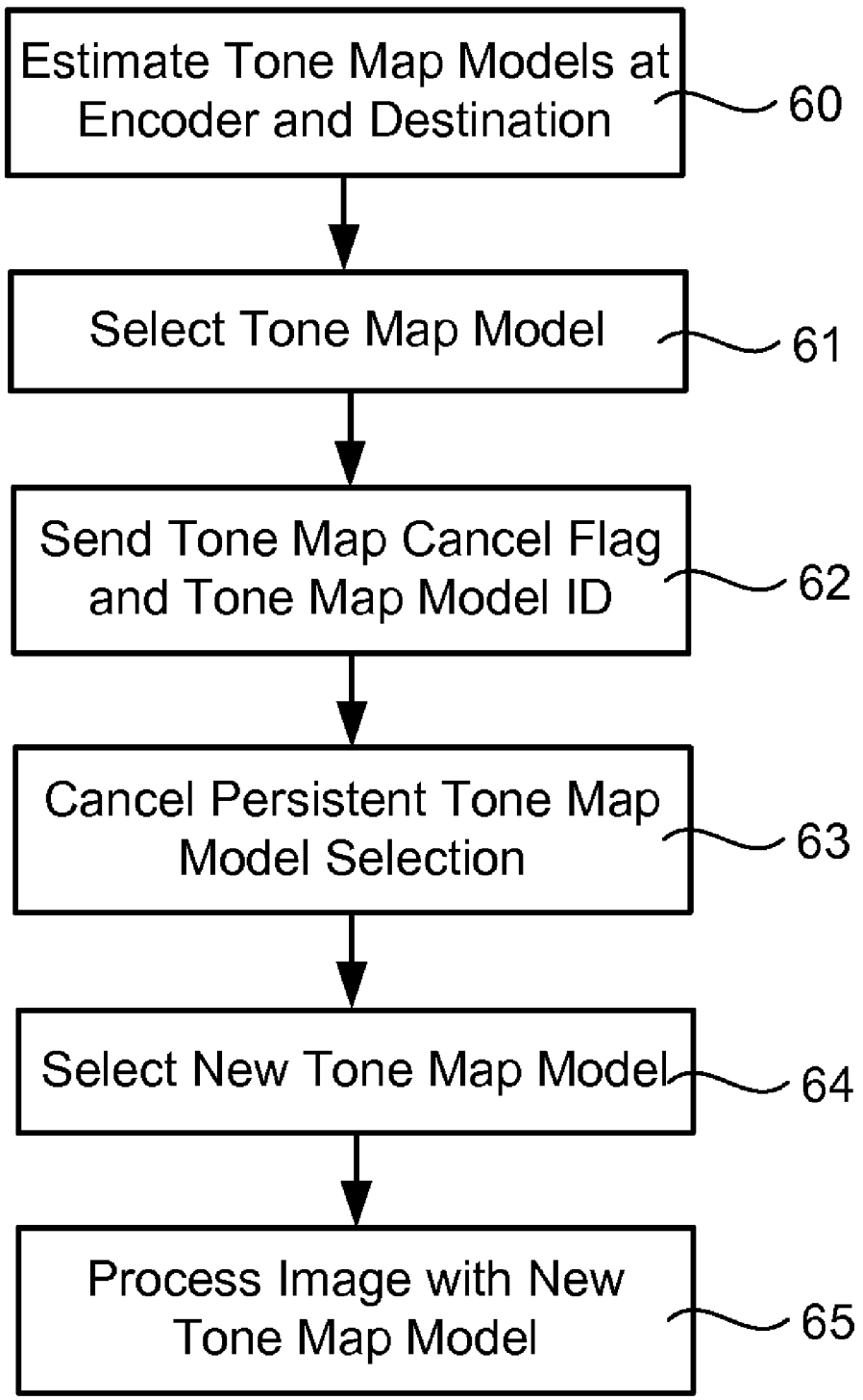
FIG. 6 is a flowchart showing steps of an exemplary embodiment comprising sending a tone map cancellation flag.

Some embodiments of the present invention may be described with reference to FIG. 6. In these embodiments, tone map models are established 60 and associated with tone map model IDs. The IDs are then stored at an encoder where they are associated with image types or other image data. The tone map models or descriptive functions are also stored at an image receiving device (IRD), such as a decoder or transcoder. A tone map model and associated configuration parameters may then be selected 61 based on the image analysis and/or other information. A tone map cancel flag may then be sent and the selected tone map model ID may then be sent 62 to an IRD. Upon receipt at the IRD, the cancel flag may be used to cancel 63 a persistent tone map model selection. A new tone map model selection 64 may then be applied 65 to subsequent image processing tasks.

Figure 7:
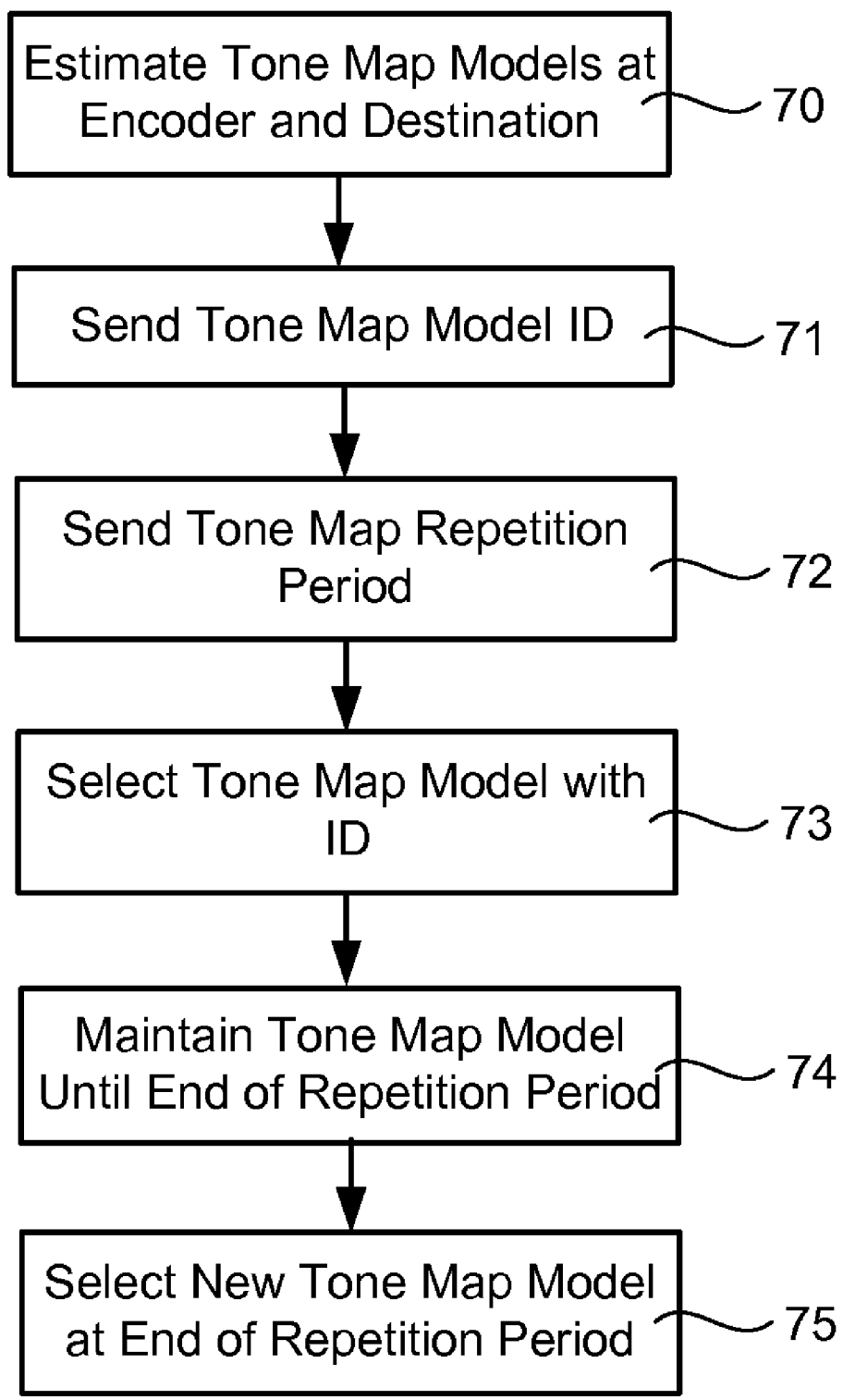
FIG. 7 is a flowchart showing steps of an exemplary embodiment comprising sending a tone map repetition period.

Some embodiments of the present invention may be described with reference to FIG. 7. In these embodiments, tone map models are established 70 and associated with tone map model IDs. The IDs are then stored at an encoder where they are associated with image types or other image data. The tone map models or functions are also stored at an image receiving device (IRD), such as a decoder or transcoder. One or more tone maps may then be generated based on the image analysis and/or other information. The model IDs and associated configuration parameters corresponding to these maps may then be selected and sent 71 to an IRD. A tone map repetition period may also be sent 72 to an IRD. A tone map model or other related tone map parameter may then be selected and applied 73 at the IRD. This tone map model selection or related parameter may be maintained 74 at the IRD for a period specified in the tone map repetition period. This period may be a specified time interval or may be related to a processing period for a series of images or frames or portions thereof regardless of the traditional time period associated with processing the image or images. After the period has expired, a new tone map model or related parameter may be selected 75 or a default value may be selected.

Figure 8:
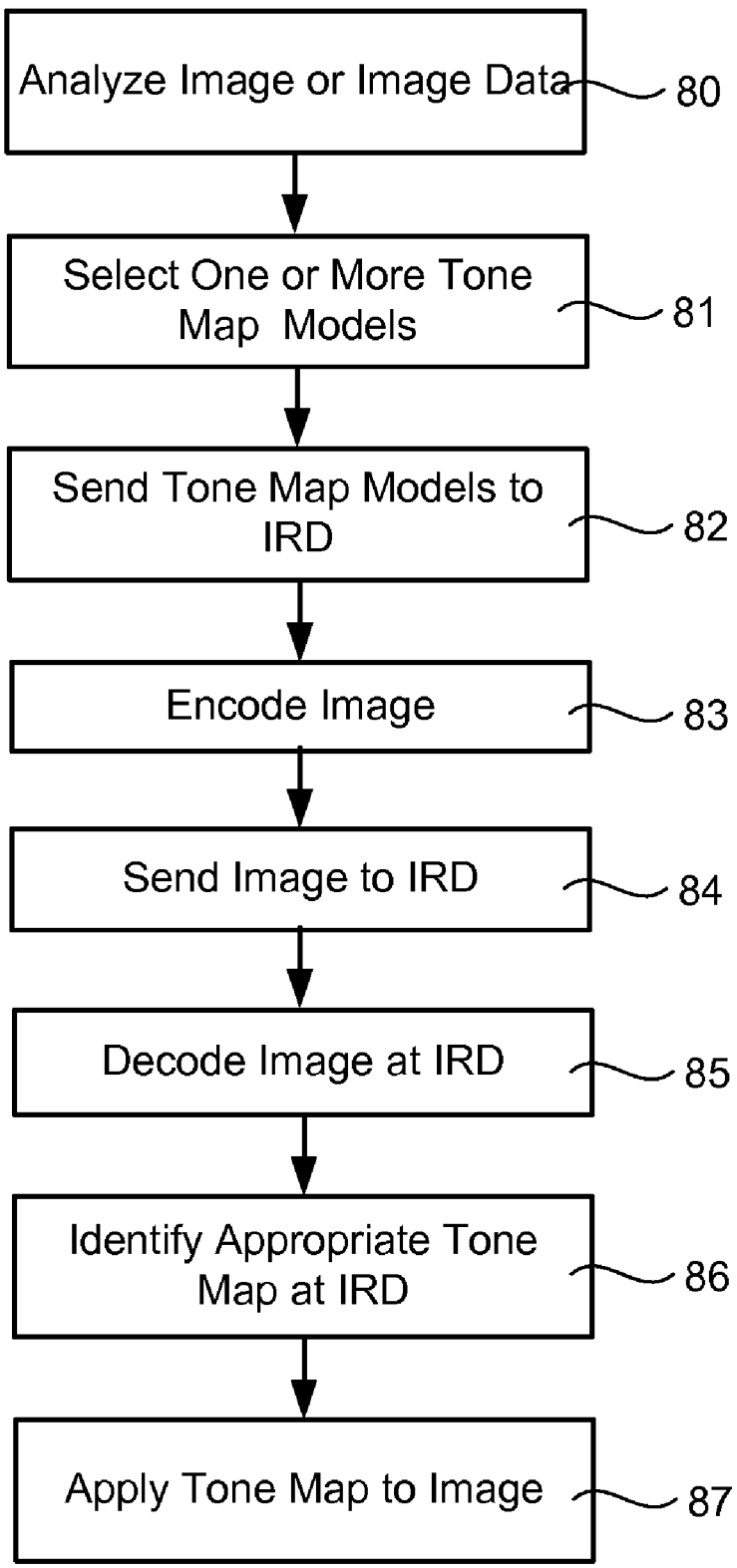
FIG. 8 is a flowchart showing steps of an exemplary embodiment comprising application of tone maps to an image.

Some embodiments of the present invention may be described with reference to FIG. 8. In these embodiments, an image or image data may be analyzed or read 80 to determine image characteristics. In some embodiments, this step may comprise reading an image file header or other metadata to determine image characteristics. In some embodiments, the image may be analyzed directly to obtain image information. Once image information is obtained, one or more tone maps may be selected 81 based on the image characteristics. Each of the selected tone maps may correspond to a different display device or IRD characteristic. In some embodiments, a tone map may be selected for various standard IRD bit-depths.

These tone maps may then be sent 82 to an IRD. The image may be encoded 83 and sent 84 to the IRD. After receipt at the IRD, the image may be decoded 85 and the tone maps may be reviewed to determine 86 which tone map best accommodates the IRD characteristics. In some embodiments, a tone map ID assigned to a tone map may be used to determine which tone map should be used for a particular IRD characteristic. In some embodiments, a tone map ID may identify the bit-depth for which the tone map is intended to be used. Once a tone map is selected 86, the tone map may be applied to the image 87.

Figure 9:
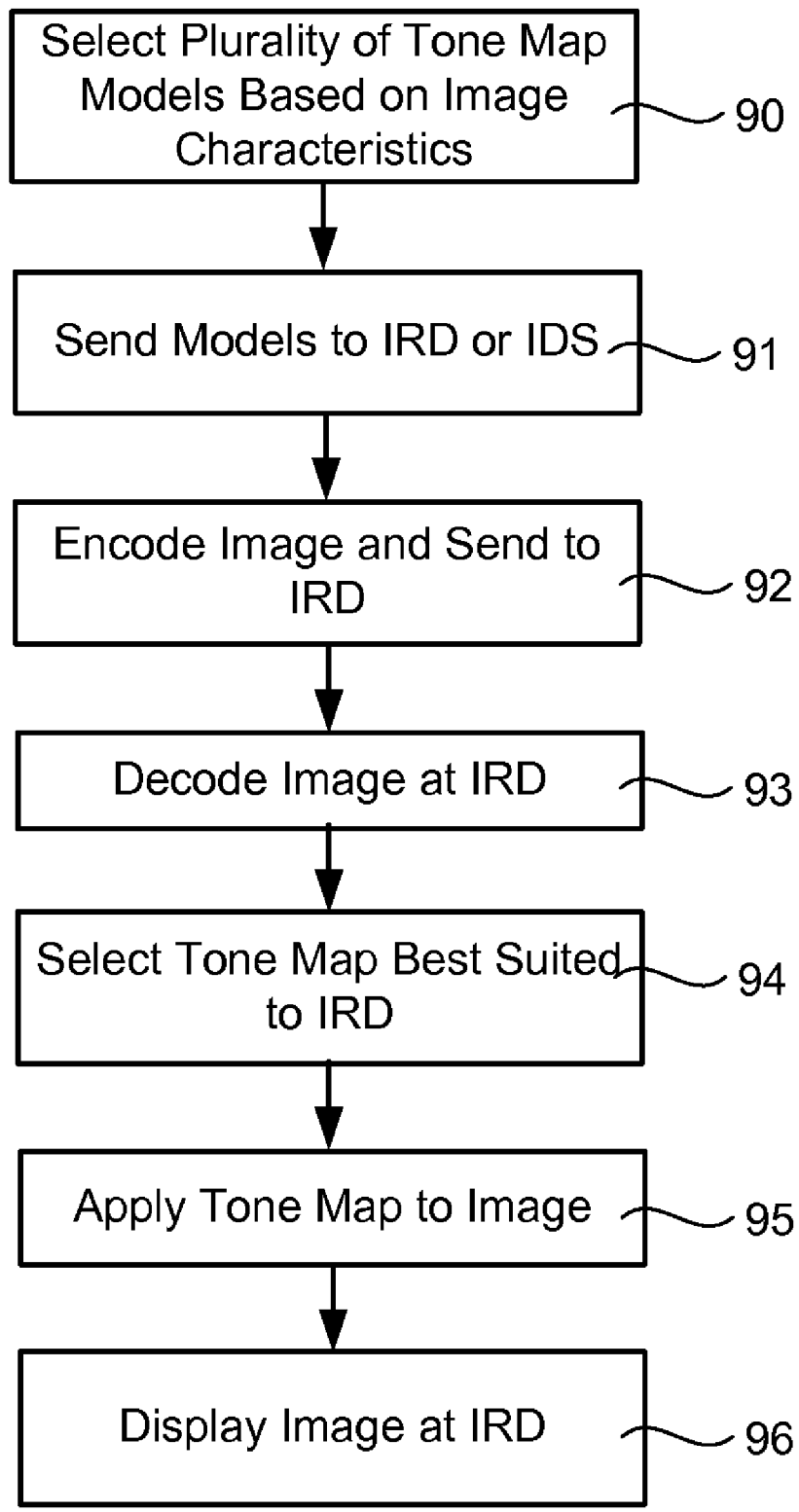
FIG. 9 is a flowchart showing steps of an exemplary embodiment comprising tone map selection at an image receiving device.

Some embodiments of the present invention may be described with reference to FIG. 9. In these embodiments, a plurality of tone map models are generated or selected at an encoder based on image characteristics or other information. In some embodiments, these tone maps may be described with reference to a model ID and accompanying model parameters. Different tone maps in the plurality of tone maps may be distinguished by a tone map ID, which may also identify a tone map purpose, such as a destination bit-depth. Tone map models may be sent 91 to an IRD. This may be done by sending the entire model, by sending a model ID and associated parameters or by some other method. A tone map ID may also be sent with each tone map in the plurality of tone maps. Typically, the image will be encoded and sent 92 to the IRD. At the IRD, the image may be decoded 93 and the tone maps may be reviewed to determine 94 the tone map best suited to the IRD. This review may comprise the use of tone map ID data and other tone map data. The selected tone map may then be applied 95 to the decoded image. After application of the tone map, the image may be displayed 96 on the IRD.

Figure 10:
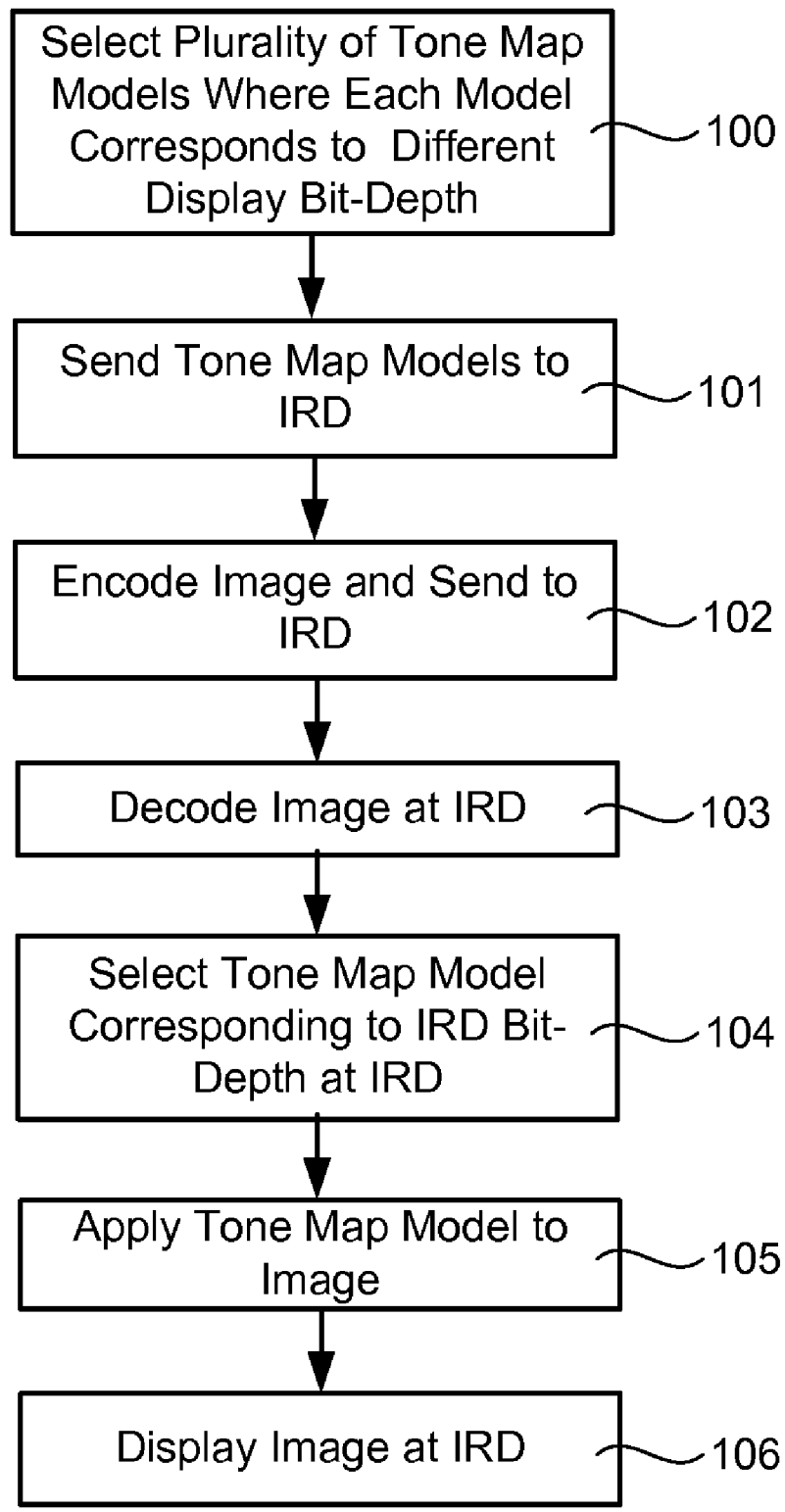
FIG. 10 is a flowchart showing steps of an exemplary embodiment comprising selection of a plurality of tone maps wherein each model corresponds to a different converted bit-depth.

Some embodiments of the present invention may be described with reference to FIG. 10. In these embodiments, a plurality of tone maps are selected or generated 100. Each tone map in the plurality of maps may correspond to a different display device bit-depth. For example, one map may convert the image from a 12-bit bit-depth to a 10-bit bit-depth and another map may convert the image from a 12-bit bit-depth to an 8-bit bit-depth. These tone maps may be represented by a complete map definition, by a model ID and associated parameters or by other methods. These maps may also be associated with tone map IDs that may define the purpose of the map, such as the destination bit-depth.

However the map is defined, the map or map data is sent 101 to an IRD. The image may also be encoded and sent 102 to the IRD. After the image is decoded 103, a tone map may be applied. Since multiple tone maps have been sent, the decoder must select 104 from the plurality of tone maps. Typically, a tone map that best matches the IRD characteristics is selected. For example, the tone map that maps to the bit-depth of the IRD may be selected. Alternatively, information from the viewer/user may lead to the selection of the tone map. Exemplary information may include viewing condition information, ambient light level information, information about the power state of the viewing device, and other recipient preference information. When the IRD is a transcoder or will not be the device on which the image is to be displayed, a tone map that matches the destination display device will be selected. The selected tone map may then be applied 105 to the image after which the image may be displayed 106 on the destination display device.

Figure 11:
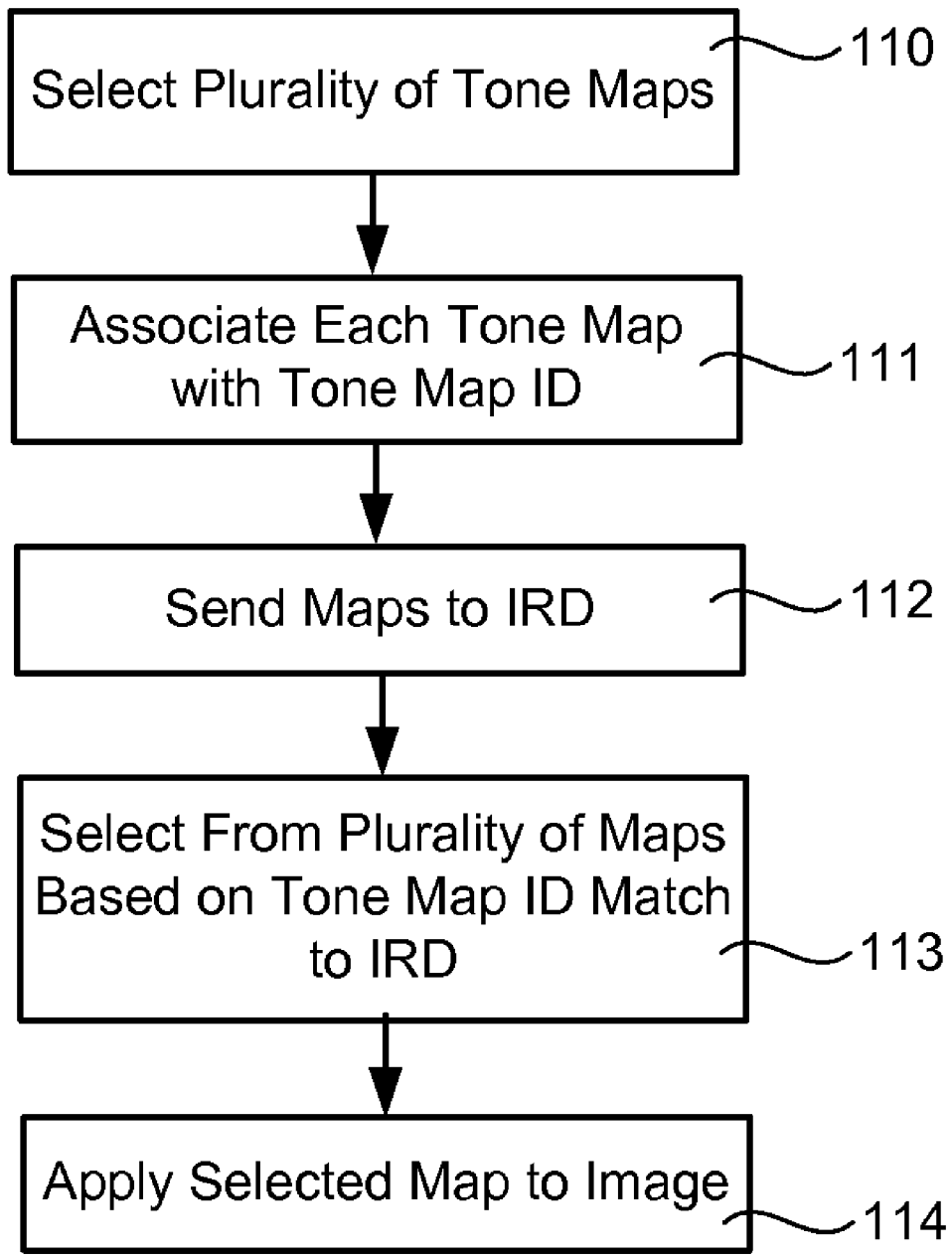
FIG. 11 is a flowchart showing steps of an exemplary embodiment comprising matching a tone map ID to an image receiving device characteristic.
Figure 12:
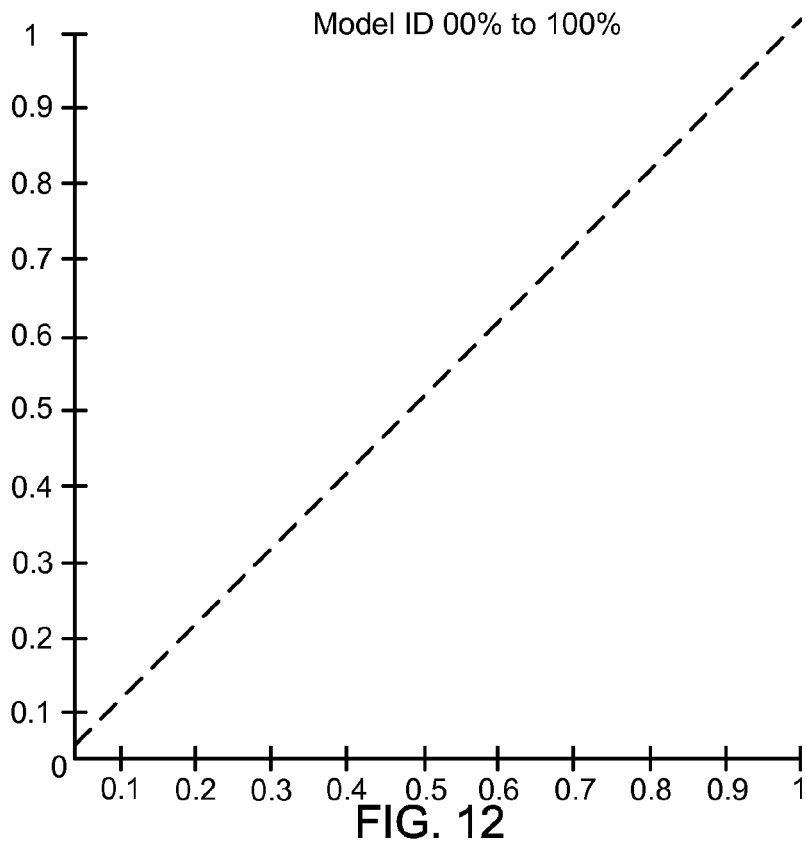
FIG. 12 is a chart showing an exemplary linear tone map.
Figure 13:
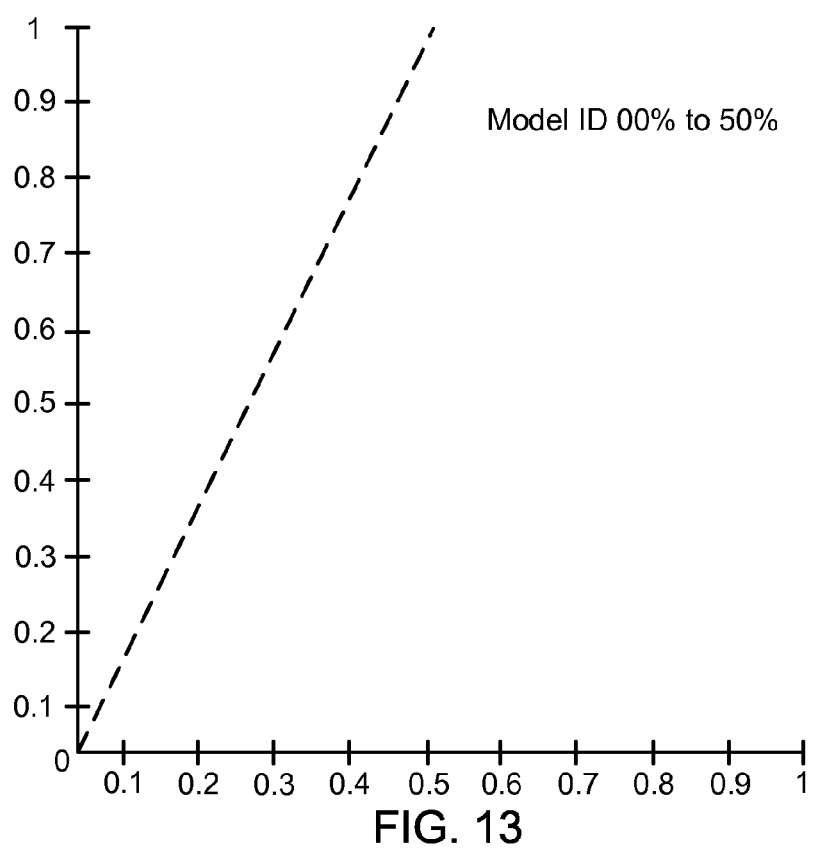
FIG. 13 is a chart showing an alternative exemplary linear tone map.
Figure 14:
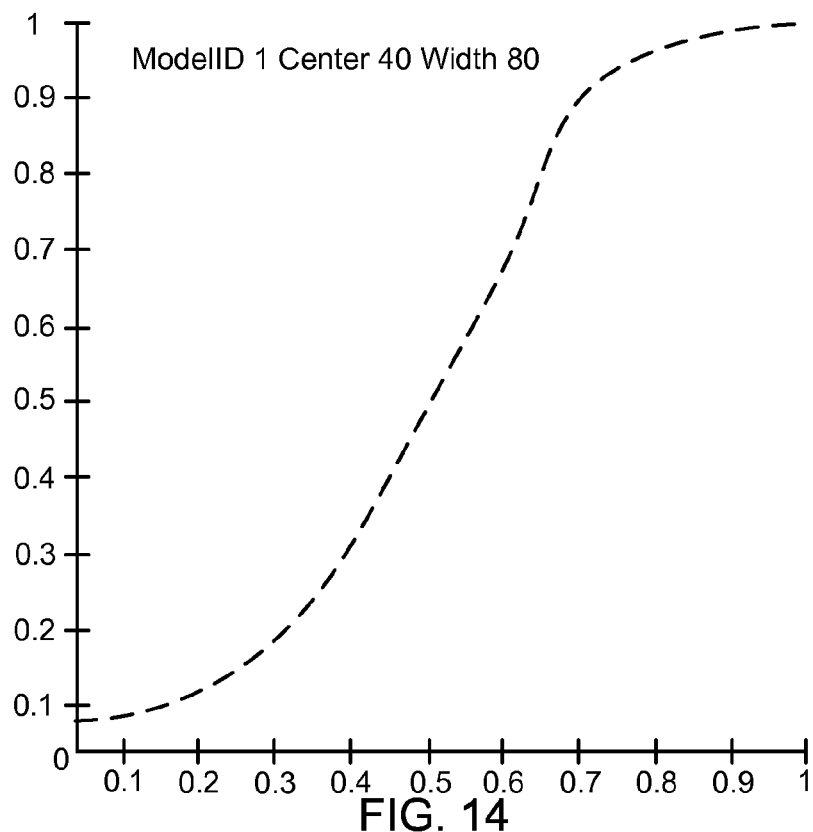
FIG. 14 is a chart showing an exemplary sigmoidal tone map.
Figure 15:
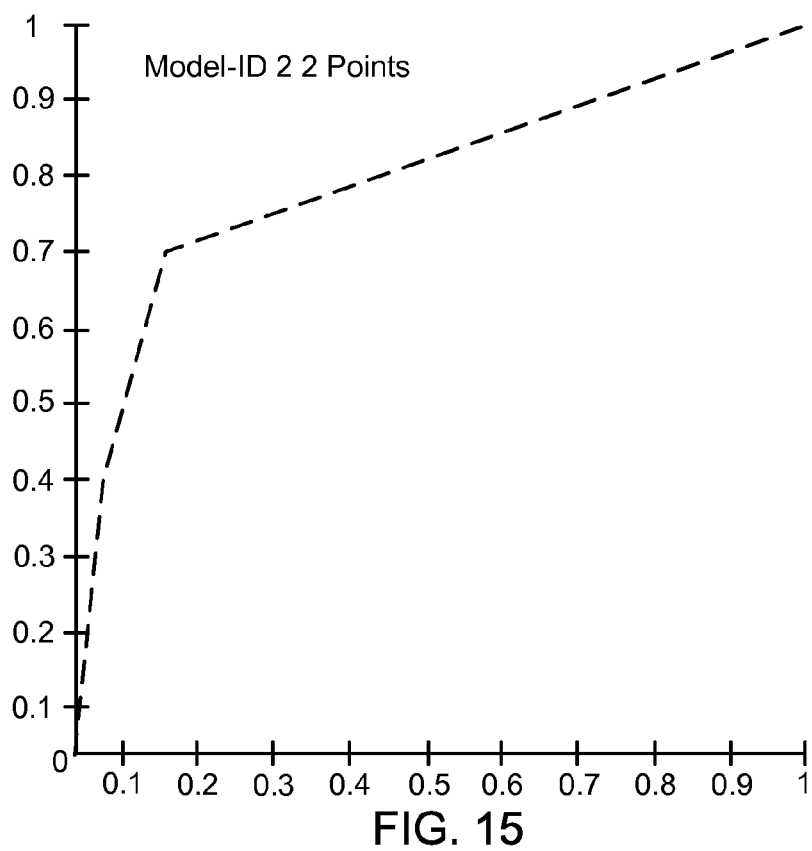
FIG. 15 is a chart showing an exemplary piecewise linear tone map.

Some embodiments of the present invention may be described with reference to FIG. 11. In these embodiments, a plurality of tone maps are selected or generated 110 at an encoder or image transmitter. Each map may be associated 111 with a tone map ID that may identify the purpose of the tone map or otherwise serve as a unique identifier of the tone map. The maps and corresponding tone map IDs may be sent 112 to an IRD, where the IRD may select 113 from the plurality of tone maps based on the tone map ID of each tone map. The selected tone map may then be applied 114 to the image.

FIGS. 12-15 illustrate exemplary tone maps that may be used in embodiments of the present invention.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A system for converting a video from a first dynamic range to a second dynamic range, said system comprising:
   a. a receiver for receiving said video and for receiving a message, wherein said message comprises:
   i) a plurality of tone maps, each for use in converting said video from said first dynamic range to said second dynamic range, said first dynamic range and said second dynamic range each represented by respectively different bit-depths, wherein each of said tone maps is defined by a model identifier (ID) and at least one model parameter, and each of said tone maps is associated with a tone map ID, which identifies the purpose of the associated tone map, where said plurality of tone maps includes at least two types selected from the group of: (1) linear mapping with clipping; (2) a sigmoidal model; (3) a user-defined look-up table; and (4) a piecewise linear model;
   b. a selector for selecting a first tone map, from said plurality of tone maps, to apply to said video; and
   c. a tone map processor for applying said first tone map to said video, thereby producing a tone-mapped video.

2. A system as described in claim 1, wherein said plurality of tone maps comprises a linear map with clipping, a sigmoidal map, a user-defined lookup table map, and a piecewise linear map.

3. A system as described in claim 1 further comprising a transmitter for transmitting said tone-mapped video.

4. A system as described in claim 1, wherein said message is a Supplemental Enhancement Information (SEI) message.

5. A system as described in claim 1, wherein said message further comprises a tone map cancel flag for canceling the persistence of a previous tone map message.

6. A system as described in claim 1, wherein said message further comprises a tone map repetition period message.

7. A system as described in claim 1, wherein said message allows said selector to select said first tone map so that said first tone map corresponds to a recipient device dynamic range.

8. A system as described in claim 1, wherein said selector selects said first tone map according to at least one recipient preference.

9. A method for converting a video from a first dynamic range to a second dynamic range, said method comprising:
   a. receiving a message and a video at a receiver, wherein said message comprises more than one tone map model identifier (ID), wherein each of said more than one tone map model ID is associated with a respectively different tone map, and said message further comprises, for each of said more than one tone map model ID, at least one model parameter for said associated tone map;
   b. determining a first tone map to apply to said video having said first dynamic range from said more than one tone map model ID, wherein said first tone map maps said first dynamic range to said second dynamic range, said first dynamic range and said second dynamic range each represented by respectively different bit-depths;
   c. constructing said first tone map using said at least one model parameter associated with said first tone map; and
   d. applying said first tone map to said video, thereby producing a video with said second dynamic range.

10. A method as described in claim 9, wherein said second dynamic range corresponds to a recipient device dynamic range.

11. A method as described in claim 9, wherein said message allows said determining to be based on recipient preferences.

12. A method as described in claim 9, wherein said message is a Supplemental Enhancement Information (SEI) message.

13. A method as described in claim 9, wherein each of said more than one tone map ID identifies a dynamic range for said tone map.

14. A method as described in claim 9, wherein said tone map represented by the selected said more than one tone map model ID is a tone map selected from the group consisting of a linear map with clipping, a sigmoidal map, a user-defined lookup table map, and a piecewise linear map.

15. A method as described in claim 9, wherein said message further comprises a tone map cancel flag for canceling the persistence of a previous tone map message.

16. A method as described in claim 9, wherein said message further comprises a tone map repetition period message.

17. A method as described in claim 9 further comprising receiving a bitstream, wherein said bitstream comprises said video with said first dynamic range.

18. A method as described in claim 17, wherein said bitstream further comprises said message.

19. A method as described in claim 9 further comprising transmitting said video with said second dynamic range.

20. A method as described in claim 17 further comprising transmitting said video with said second dynamic range.

21. A method for signaling tone map data from a video encoder to a video recipient, said method comprising:
   a. establishing more than one tone map, each for use in converting said a video from a first dynamic range to a second dynamic range, said first dynamic range and said second dynamic range each represented by respectively different bit-depths;
   b. representing each of said more than one tone map with a model identifier (ID) and at least one model parameter; and
   c. sending a video and a message to a receiver, wherein said message comprises said tone map model ID and said at least one model parameter associated with said tone map model ID, wherein said recipient may use said tone map model ID and said at least one model parameter to identify a said tone map to apply to said video.

22. A method as described in claim 21 wherein said message is a Supplemental Enhancement Information (SEI) message.

23. A method as described in claim 21 wherein said at least one tone map comprises a linear map with clipping, a sigmoidal map, a user-defined lookup table map and a piecewise linear map.

24. A method as described in claim 21 further comprising a tone map ID for each of said at least one tone maps, wherein said tone map ID identifies a dynamic range for its associated tone map.

25. A method as described in claim 21 wherein said message is transmitted outside the bitstream in which said video is transmitted.

26. A method as described in claim 21 wherein said message further comprises a tone map cancel flag for canceling the persistence of a previous tone map message.

27. A method as described in claim 21 wherein said message further comprises a tone map repetition period message.

28. A method as described in claim 21, wherein said message allows said recipient to select one of said plurality of tone maps that corresponds to a recipient device dynamic range.

29. A method as described in claim 21, wherein said message allows said recipient to select one of said plurality of tone maps that corresponds to at least one recipient preference.

* * * * *

UNITED STATES PATENT AND TRADEMARK OFFICE
CERTIFICATE OF CORRECTION

PATENT NO. : 8,194,997 B2
APPLICATION NO. : 11/566657
DATED : June 5, 2012
INVENTOR(S) : Christopher A. Segall, Louis Joseph Kerofsky and Shawmin Lei It is certified that error appears in the above-identified patent and that said Letters Patent is hereby corrected as shown below:

Col. 4, Line 63

Change "0 to $232^{32}-1$" to --0 to $2^{32}-1$--.

Col. 12, Line 45

After "converting" delete "said".

Signed and Sealed this
Fourteenth Day of August, 2012

David J. Kappos
*Director of the United States Patent and Trademark Office*